Aug. 31, 1948.  T. M. BOYER ET AL  2,448,209
ARRESTING UNIT FOR AIRCRAFT LANDING SYSTEM
Filed Jan. 23, 1946  4 Sheets-Sheet 1

INVENTOR.
TAYLOR M. BOYER AND
BY CLARENCE R. GOTTSCHALL

THEIR ATTORNEY.

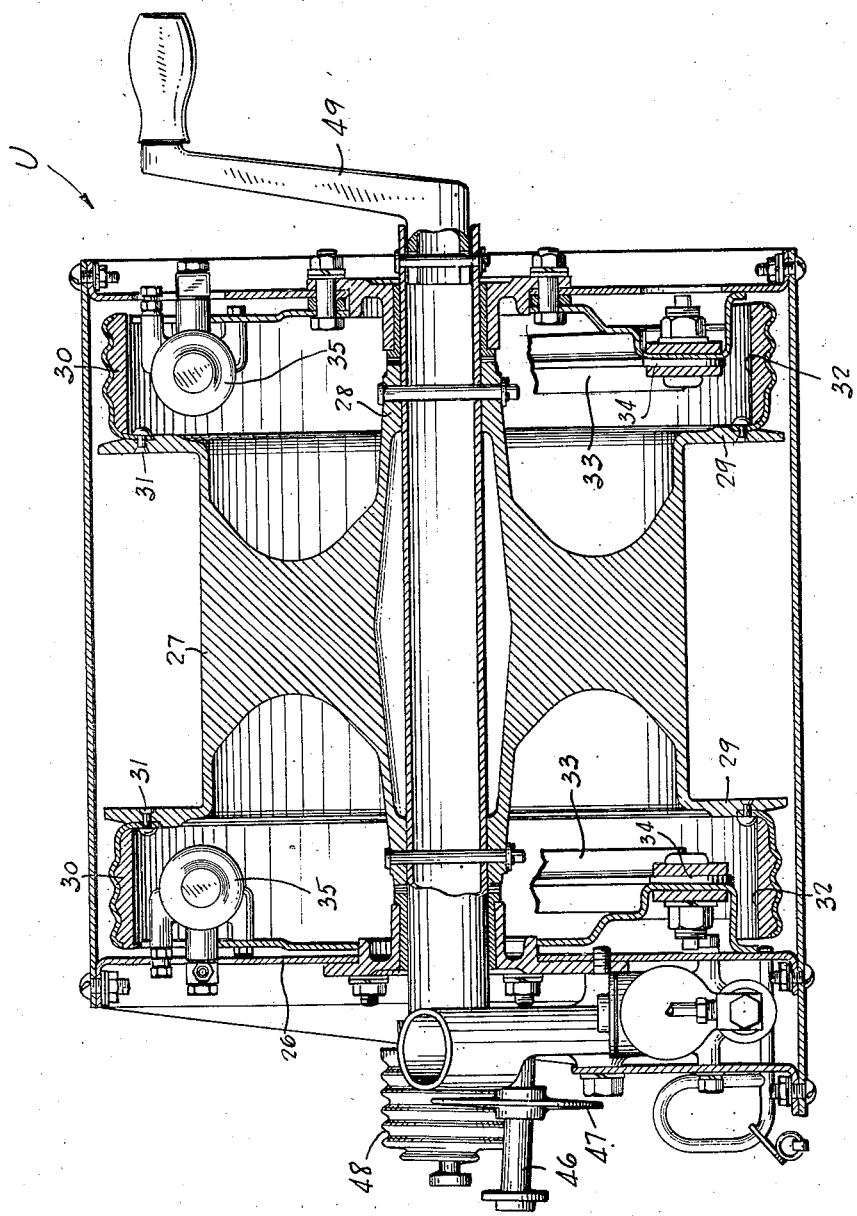

Aug. 31, 1948. T. M. BOYER ET AL 2,448,209
ARRESTING UNIT FOR AIRCRAFT LANDING SYSTEM
Filed Jan. 23, 1946 4 Sheets-Sheet 3
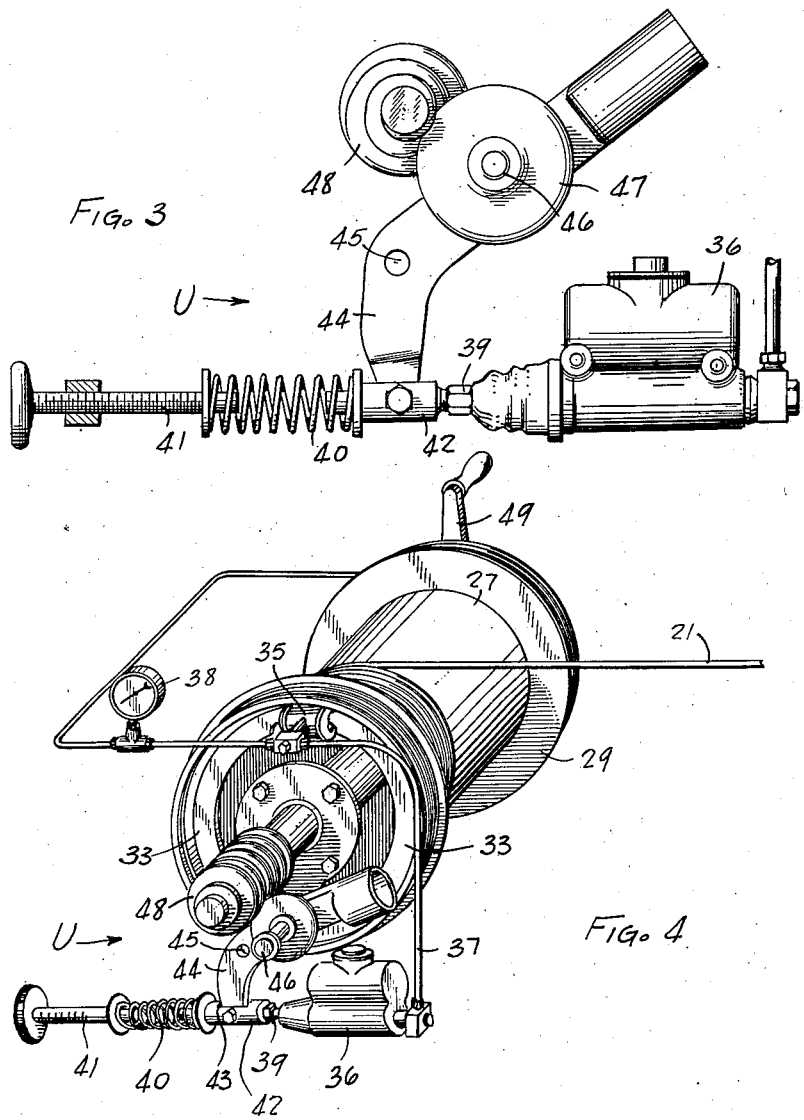
INVENTOR.
TAYLOR M. BOYER AND
BY CLARENCE R. GOTTSCHALL
THEIR ATTORNEY.

Aug. 31, 1948. T. M. BOYER ET AL 2,448,209
ARRESTING UNIT FOR AIRCRAFT LANDING SYSTEM
Filed Jan. 23, 1946 4 Sheets-Sheet 4
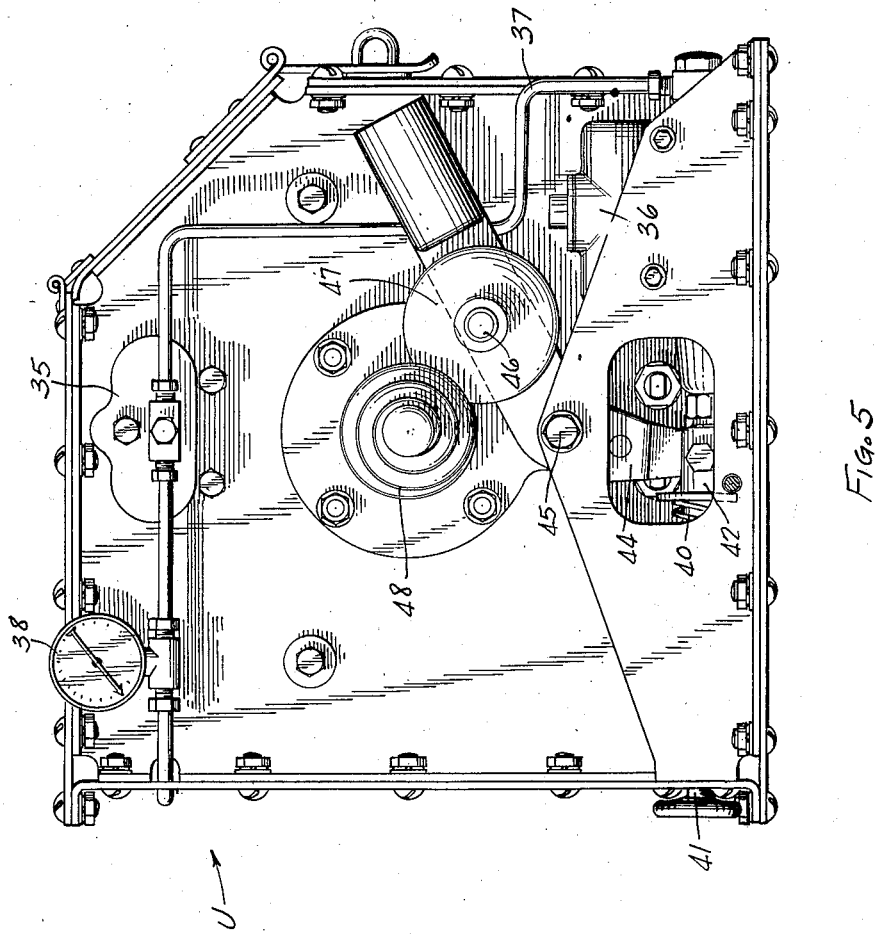
INVENTOR.
TAYLOR M. BOYER AND
BY CLARENCE R. GOTTSCHALL
John A. Robertson
THEIR ATTORNEY.

Patented Aug. 31, 1948

2,448,209

UNITED STATES PATENT OFFICE 2,448,209

ARRESTING UNIT FOR AIRCRAFT LANDING SYSTEM

Taylor M. Boyer and Clarence R. Gottschall, Wilmington, Del., assignors to All American Aviation, Inc., Wilmington, Del., a corporation of Delaware Application January 23, 1946, Serial No. 642,808

6 Claims. (Cl. 244—110)

This invention relates to aircraft landing systems and is concerned primarily with the arresting unit which is included in such a system as an essential element thereof.

With the advent of the world war there has come into use certain apparatus employed for the purpose of landing aircraft. This apparatus is commonly known as a "Brodie system" and comprises generally a trolley to which an aircraft which is to be landed is adapted to be attached. This trolley moves over a guide line and connected thereto is a line which is taken up on an energy-absorbing winch. This winch is commonly known as the arresting unit. It is with such an arresting unit that this invention is primarily concerned.

In providing an arresting unit for aircraft landing systems of the type above noted, certain factors assume importance. In the first place, the device must operate with a degree of certainty which will eliminate any possibility of its failing to function at the time and in the manner intended. In view of this requirement the invention has as an object the provision of an arresting unit of the character above noted which includes hydraulic braking instrumentalities for retarding rotation of the drum.

An aircraft landing system of the type with which this invention is concerned requires that the aircraft be brought to a stop within a certain predetermined distance. This means that various aircraft must be landed with a high degree of uniformity. To the end of achieving this uniformity the invention has as a further object the provision of an arresting unit including hydraulic braking instrumentalities which are adjustable to provide for an accurate setting of the hydraulic pressure which will be applied to the braking means; thus, aircraft of various sizes and different landing speeds may be accommodated due to this adjustability.

When a landing aircraft first engages the trolley, it has a fairly high velocity. This means that the drum of the winch must be quickly accelerated to a high speed of rotation in a very brief interval. It is enough that the momentum of inertia of the drum be overcome to achieve this rapid acceleration without having any braking resistance which also must be overcome.

Accordingly, a further object of the invention is the provision, in an arresting unit of the type noted, of time delay mechanism which is operatively associated with the hydraulic braking instrumentalities. This mechanism provides a predetermined interval which must elapse after the drum is started in rotation before the brakes are applied.

Various other more detailed objects and advantages of the invention such as arise in connection with the carrying out of the above noted thoughts in a practical embodiment will in part become apparent and in part be hereinafter stated as the description of the invention proceeds.

The invention, therefore, comprises an arresting unit for aircraft landing systems and which unit consists of a winch, hydraulic braking instrumentalities associated with the winch and including means for adjusting the hydraulic pressure thereof, together with time delay mechanism for controlling the momentum of initiation of brake application.

For a full and more complete understanding of the invention, reference may be had to the following descriptions and accompanying drawings wherein Figure 1 is a perspective view, somewhat diagrammatic, of an aircraft landing system of the type with which this invention is concerned.

Figure 2 is a transverse section through the arresting unit.

Figure 3 is an enlarged detailed view in side elevation developing certain parts of the time delay mechanism.

Figure 4 is a perspective view of the drum and associated hydraulic braking instrumentalities shown as removed from the remainder of the structure and Figure 5 is an end elevation of the unit.

Figure 1:
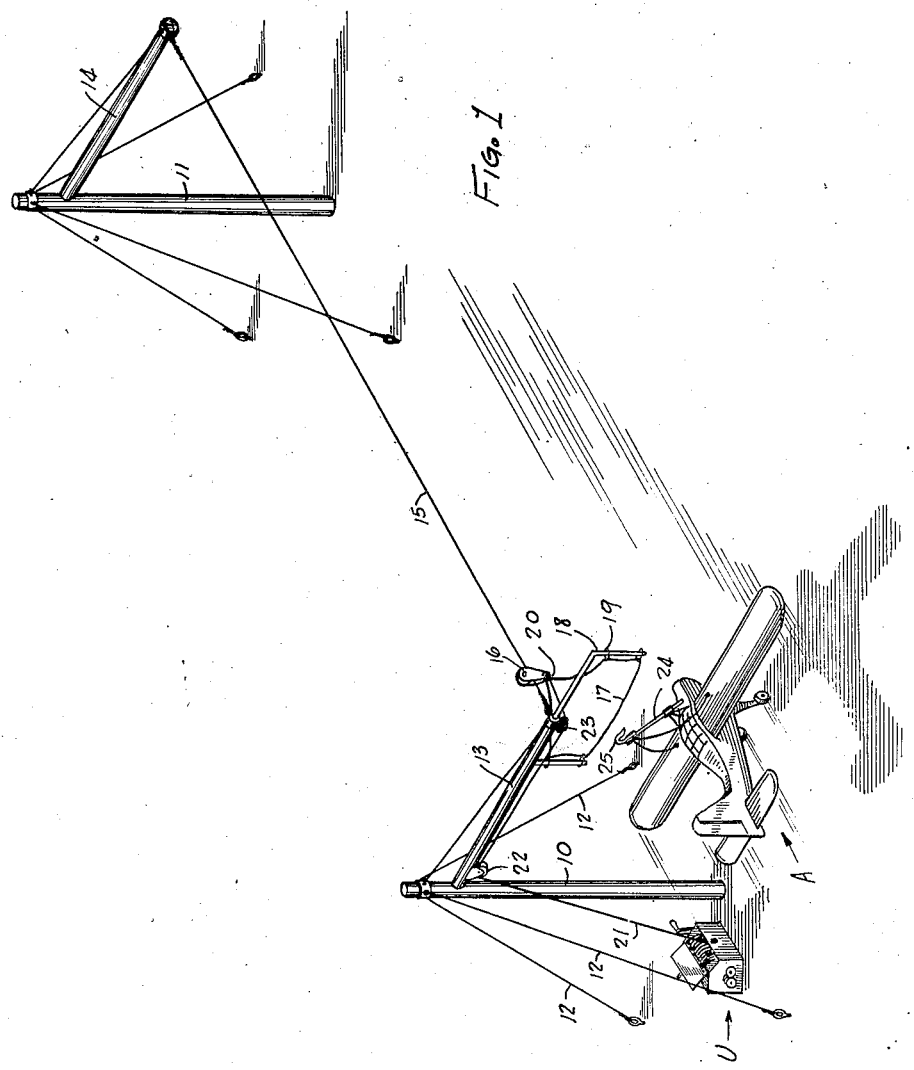

Referring now to the drawings wherein like reference characters denote corresponding parts and first, more particularly to Figure 1, an aircraft landing system of the type with which this invention is concerned is shown as comprising a pair of spaced uprights 10 and 11 which may be suitably supported by guy wires 12. It is to be understood that the uprights 10 and 11 may be mounted on any appropriate surface such as the deck of a ship or on a landing field. Extending outwardly from the upright 10 and substantially normal thereto is a horizontal bar 13 while a similar horizontal bar 14 extends outwardly from the upright 11. Extending between the outer ends of the bars 13 and 14 is a guide line 15 on which is suspended a trolley which is designated 16.

A contact loop 17 is shown as yieldably held in position in a frame 18 by clips 19. The frame 18 is carried by the outer end of the bar 13. This contact loop is connected to the trolley 16 by the connection shown at 20.

An arresting unit is referred to in its entirety by the reference character U and this unit may be located in any suitable position adjacent to the upright 10. A line 21 preferably of nylon or equivalent synthetic plastic fibers extends from the unit U over sheaves 22 and 23 to the trolley 16.

An aircraft which is to be brought to a stop by the landing system above described is indicated at A. The aircraft A carries an upwardly extending arm 24 on the free end of which is a hook 25 that is adapted to engage the contact loop 17.

Referring now more particularly to Figures 2 to 5 inclusive, the unit U is shown as comprising a casing structure which encloses the winch mechanism and which provides side frames 26 which constitute the supporting structure for the winch mechanism.

Referring now more particularly to Figures 2 and 4, a drum 27 is shown as carried by a shaft 28 which is journaled in the side frames 26. The drum 27 includes side flanges 29 which together with the outer cylindrical surface of the drum define the space in which the line 21 is accommodated.

A brake drum 30 is anchored to each of the side flanges 29 in any preferred manner such as by the fastening elements shown at 31. There is a brake drum 30 at each end of the drum 27 and these drums 30 may take the form of the ordinary automotive brake which offers an inner cylindrical braking surface 32. Cooperating with this braking surface 32 are a pair of brake shoes 33 which are pivotally anchored to the side frames as shown at 34. The upper ends of the brake shoes 33 are operatively connected to a hydraulic actuating mechanism 35.

A master hydraulic cylinder is shown at 36 and this cylinder is placed in conductive communication with the actuating mechanism 35 by tubing 37. The latter may include a gauge shown at 38 for indicating the pressure in the line.

Referring now more particularly to Figure 3, a master cylinder 36 is shown as including a main control plunger 39 which is adapted to be affected by a spring 40 the effective tension of which may be adjusted by the screw stem shown at 41. The plunger 39 carries a member 42 formed with a recess 43 and one end of a locking lever 44 is received in this recess. The lever 44 is in the shape of a bell crank that is pivotally mounted at 45 on the respective side frame. One arm of the bell crank or lever 44 carries a stub shaft 46 on which is slidably mounted a disc 47. The peripheral edge of the latter meshes with screw thread convolutions 48 which are formed on the end of the shaft 28. It is evident that just so long as the disc 47 engages the convolutions 48 the bell crank 44 will hold the plunger outwardly against the influence of the spring 40. However, when the disc 47 rides off the convolution 48, which will occur after a predetermined number of revolutions of the shaft 28, the spring 40 is rendered effective to bear against the plunger 39 with a predetermined pressure and thus affect the hydraulic system to cause the actuating mechanisms 35 to apply the brakes.

The end of the shaft remote from the convolutions 48 may be provided with a handle 49 which may be employed in setting the device by taking up the disc 47 a required number of turns on the convolutions 48.

While the mode of operation of the above described mechanism is believed to be obvious, it may be briefly outlined by noting that the stem 41 is first adjusted to set up the required tension of the spring 40. It is the tension of this spring which determines the hydraulic pressure which is applied to the brake shoes 33. The disc 47 will also be taken up a required number of turns on the convolutions 48. The number of these turns determines the interval during which the drum will rotate free of brake application. The trolley 16 is retracted to the position adjacent to the upright 10 and the contact loop 17 is held in the frame 18 by the clips 19.

As the plane A comes in the hook 25 engages the contact loop 17 and starts to pull the trolley 16 along the guide 15. This exerts a pull on the line 21. Due to the properties of this line which are present because of the line being made from nylon or equivalent synthetic plastic fibers a large portion of the initial shock is absorbed in the line itself. However, the pull on the line also causes a rapid acceleration of rotation of the drum 27. As the drum first rotates the brakes are not applied because the bell crank 44 holds the plunger 39 outwardly in non-applying position. After the drum 27 has rotated a predetermined number of revolutions, the disc 47 rides off the convolutions 48 thereby permitting the spring 40 to urge the plunger 39 inwardly into brake applying position. The hydraulic pressure is now rendered effective in the actuating mechanisms 35 and the brake shoes 33 are urged against the braking surfaces 32 so as to resist rotation of the drum 27. This brings the aircraft to a stop within the predetermined distance.

While a preferred specific embodiment of the invention is hereinbefore set forth it is to be clearly understood that the invention is not to be limited to the exact construction illustrated and described because various modifications of these details may be provided in putting the invention into practice within the purview of the appended claims.

What is claimed is:

1. In an aircraft landing system, an arresting unit comprising a shaft, a drum drivably mounted on said shaft, a line on said drum, braking devices associated with said drum, a hydraulic system for operating said braking devices and including a main control tank, a threaded sleeve on said shaft, and means meshing with said threaded sleeve and operatively associated with said control tank to render said hydraulic system effective after a predetermined number of revolutions of said shaft.

2. In an aircraft landing system, an arresting unit comprising a shaft, a drum drivably mounted on said shaft, a line on said drum, braking devices associated with said drum, a hydraulic system for operating said braking devices and including a main control tank, means to vary the effective hydraulic pressure of said control tank whereby the brake applying force is adjusted, and mechanism operatively associated with said shaft and tank, whereby said hydraulic system is rendered effective after a predetermined number of revolutions of said shaft.

3. In an aircraft landing system, an arresting unit comprising a shaft, a drum drivably mounted on said shaft, a line on said drum, braking devices associated with said drum, a hydraulic system for operating said braking devices and including a main control tank, a threaded sleeve drivably carried by said shaft, a disc meshing with the threads of said sleeve, a bell crank carrying said disc, and mechanism associated with said bell crank and control tank whereby a change in position of said bell crank renders said hydraulic system effective to apply said brakes.

4. In an aircraft landing system, an arresting unit comprising a shaft, a drum drivably mounted on said shaft, a line on said drum, braking devices associated with said drum, a hydraulic system for operating said braking devices and including a main control tank, a plunger projecting from said control tank, a spring means normally urging said plunger into a retracted position within said tank, a bell crank having one end in interlocking arrangement with said plunger, and mechanism operatively associated with said shaft and bell crank for breaking the interlock between said bell crank and plunger after a predetermined number of revolutions of said shaft.

5. In an aircraft landing system, an arresting unit comprising a shaft, a drum drivably mounted on said shaft, a line on said drum, braking devices associated with said drum, a hydraulic system for operating said braking devices and including a main control tank, a plunger partially received within said tank, said plunger having a portion exteriorly of said tank formed with a recess, a spring normally urging said plunger into said tank, means for adjusting the tension of said spring, a bell crank having one end received in said recess, a disc rotatively carried by said bell crank, and a sleeve drivably carried by said shaft and having threads receiving the edge of said disc.

6. In an aircraft landing system, an arresting unit comprising a drum, a rotatable shaft for mounting said drum extending beyond an end of the drum, means on said extended shaft end, a line on said drum connected to an aircraft, braking devices operatively associated with a surface of said drum, a hydraulic system controlling the operation of the said braking devices, a plunger for actuating the braking devices, control means for said system engageable and disengageable with said first means after a predetermined number of drum revolutions, and resilient means normally held under tension by said system control means for imparting power to the plunger upon disengagement of said system control means with the said first means, to thereby release the tension of said resilient means and impart movement to the plunger to apply the braking devices.

TAYLOR M. BOYER.
CLARENCE R. GOTTSCHALL.

REFERENCES CITED

The following references are of record in the file of this patent:

UNITED STATES PATENTS

| Number | Name | Date |
|---|---|---|
| 1,359,993 | House | Nov. 23, 1920 |
| 1,789,653 | Hoyt | Jan. 20, 1931 |
| 2,373,413 | Plummer | Apr. 10, 1945 |

FOREIGN PATENTS

| Number | Country | Date |
|---|---|---|
| 287,198 | Great Britain | Mar. 12, 1928 |